United States Patent
Liang et al.

(10) Patent No.: US 12,484,003 B2
(45) Date of Patent: Nov. 25, 2025

(54) WIRELESS COMMUNICATION METHOD, FIRST DEVICE AND SECOND DEVICE

(71) Applicant: GUANGDONG OPPO MOBILE TELECOMMUNICATIONS CORP., LTD., Dongguan (CN)

(72) Inventors: Bin Liang, Dongguan (CN); Zhe Fu, Dongguan (CN); Jing Xu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 319 days.

(21) Appl. No.: 18/210,801

(22) Filed: Jun. 16, 2023

(65) Prior Publication Data
US 2023/0328676 A1 Oct. 12, 2023

Related U.S. Application Data

(63) Continuation of application No. PCT/CN2021/073412, filed on Jan. 22, 2021.

(51) Int. Cl.
*H04W 56/00* (2009.01)

(52) U.S. Cl.
CPC ..... *H04W 56/005* (2013.01); *H04W 56/0015* (2013.01)

(58) Field of Classification Search
None
See application file for complete search history.

(56) References Cited

U.S. PATENT DOCUMENTS

2021/0185653 A1* 6/2021 Uchino ................ H04W 48/16

FOREIGN PATENT DOCUMENTS

| CN | 1241849 A | 1/2000 |
|---|---|---|
| CN | 111615186 A | 9/2020 |
| CN | 111770565 A | 10/2020 |
| CN | 111800851 A | 10/2020 |
| CN | 112314019 A | 2/2021 |
| EP | 3468266 A1 | 4/2019 |

(Continued)

OTHER PUBLICATIONS

International Search Report and Written Opinion dated Oct. 25, 2021 in International Application No. PCT/CN2021/073412. English translation attached.

(Continued)

*Primary Examiner* — Jutai Kao
(74) *Attorney, Agent, or Firm* — Sheppard, Mullin, Richter & Hampton LLP (57) ABSTRACT

The embodiments of the present disclosure provide a wireless communication method, a first device, and a second device. The method includes: receiving, by a first device, first time indication information, the first time indication information being used to determine a first time length, and the first time length being used to determine a delay compensation amount and/or a Timing Advance (TA) value. In the embodiment of the present disclosure, the first device receives the first time indication information and determines the delay compensation amount and TA value based on the first time length determined from the first time indication information, so as to achieve clock synchronization and meet the synchronization accuracy requirement.

20 Claims, 3 Drawing Sheets

(56) References Cited

FOREIGN PATENT DOCUMENTS

| EP | 3745784 A1 | 12/2020 |
|---|---|---|
| EP | 3993519 A1 | 5/2022 |
| WO | 2020258032 A1 | 12/2020 |
| WO | 2020258962 A1 | 12/2020 |

OTHER PUBLICATIONS

Extended European Search Report dated Jan. 2, 2024 received in European Patent Application No. EP21920323.9.

\* cited by examiner

WIRELESS COMMUNICATION METHOD, FIRST DEVICE AND SECOND DEVICE

CROSS-REFERENCE TO RELATED APPLICATIONS

This application is a continuation of International Application No. PCT/CN2021/073412 filed on Jan. 22, 2021, the entire disclosure of which is incorporated herein by reference.

TECHNICAL FIELD

The embodiments of the present disclosure relate to communication technology, and more particularly, to a wireless communication method, a first device, and a second device.

BACKGROUND

The 5th Generation (5G) mobile communication technology Industrial interest of Things (IIoT) needs to support transmission of services, such as factory automation, transport industry, and Electrical Power Distribution, in the 5G system. Based on its transmission requirements on delay and reliability, the IIoT introduces a concept of Time Sensitive Network (TSN) or Time Sensitive Communication (TSC). In the TSN, the 5G network will serve as a TSN bridge to provide services for TSN networks and services. In view of this, the New Radio (NR) system needs to provide a lower delay guarantee and a higher clock synchronization accuracy, such that when the factory automation service is transmitted in the 5G network, each point of the mechanical operation is accurate in terms of operability and continuity and meets the time requirement.

Based on the requirement of the TSN service transmission, when the TSN service is transmitted in 5G, it needs to meet the time synchronization accuracy requirement of 1 us. However, there is currently no specific solution on how to achieve clock synchronization and meet a synchronization accuracy requirement.

SUMMARY

The embodiments of the present disclosure provide a wireless communication method, a first device, and a second device, capable of achieving clock synchronization and meeting a synchronization accuracy requirement.

In a first aspect, a wireless communication method is provided. The method includes:
  receiving, by a first device, first time indication information, the first time indication information being used to determine a first time length, and the first time length being used to determine a delay compensation amount and/or a Timing Advance (TA) value.

In a second aspect, a wireless communication method is provided. The method includes:
  transmitting, by a second device, first time indication information, the first time indication information being used to determine a first time length, and the first time length being used to determine a delay compensation amount and/or a Timing Advance (TA) value.

In a third aspect, a first device is provided. The first device is configured to perform the method according to the above first aspect or any implementation thereof. In particular, the terminal device includes one or more functional modules configured to perform the method according to the above first aspect or any implementation thereof.

In a fourth aspect, a second device is provided. The second device is configured to perform the method according to the above second aspect or any implementation thereof. In particular, the network device includes one or more functional modules configured to perform the method according to the above second aspect or any implementation thereof.

In a fifth aspect, a first device is provided. The first device includes a processor and a memory. The memory has a computer program stored thereon, and the processor is configured to invoke and execute the computer program stored in the memory to perform the method according to the above first aspect or any implementation thereof.

In a sixth aspect, a second device is provided. The second device includes a processor and a memory. The memory has a computer program stored thereon, and the processor is configured to invoke and execute the computer program stored in the memory to perform the method according to the above second aspect or any implementation thereof.

In a seventh aspect, a chip is provided. The chip is configured to perform the method according to any of the above first to second aspects or any implementation thereof. In particular, the chip includes a processor configured to invoke and execute a computer program from a memory, to cause a device provided with the chip to perform the method according to any of the above first to second aspects or any implementation thereof.

In an eighth aspect, a computer-readable storage medium is provided. The computer-readable storage medium stores a computer program that causes a computer to perform the method according to any of the above first to second aspects or any implementation thereof.

In a ninth aspect, a computer program product is provided. The computer program product includes computer program instructions that cause a computer to perform the method according to any of the above first to second aspects or any implementation thereof.

In a tenth aspect, a computer program is provided. The computer program, when executed on a computer, causes the computer to perform the method according to any of the above first to second aspects or any implementation thereof.

With the above technical solutions, the first time indication information can be used to compensate the propagation delay, such that the time synchronization accuracy error of the physical layer can be within the required range. In other words, the first time indication information can be equivalent to signaling of the propagation delay compensation amount or signaling for calculation of the propagation delay compensation amount. That is, a certain calculation accuracy can be guaranteed by means of signaling exchange. In addition, calculating the TA value based on the first time indication information can ensure clock synchronization. Based on this, in the embodiment of the present disclosure, the first device receives the first time indication information and determines the delay compensation amount and TA value based on the first time length determined from the first time indication information, so as to achieve clock synchronization and meet the synchronization accuracy requirement.

DESCRIPTION OF EMBODIMENTS

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Universal Mobile Telecommunication System (UMTS), Wireless Local Area Networks (WLAN), Wireless Fidelity (WiFi), the next generation communication system, or other communication systems.

Generally, traditional communication systems can support a limited number of connections and are easy to implement. However, with the development of communication technology, mobile communication systems will support not only traditional communication, but also e.g., Device to Device (D2D) communication, Machine to Machine (M2M) communication, and Machine Type Communication (MTC), Vehicle to Vehicle (V2V) communication, etc. The embodiments of the present disclosure can also be applied to these communication systems.

Optionally, the communication system of an embodiment of the present disclosure may be applied to a Carrier Aggregation (CA) scenario, a Dual Connectivity (DC) scenario, a Standalone (SA) network deployment scenario, and the like.

The embodiments of the present disclosure are not limited to any frequency spectrum. For example, the embodiments of the present disclosure may be applied to licensed spectrum or unlicensed spectrum.

Figure 1:
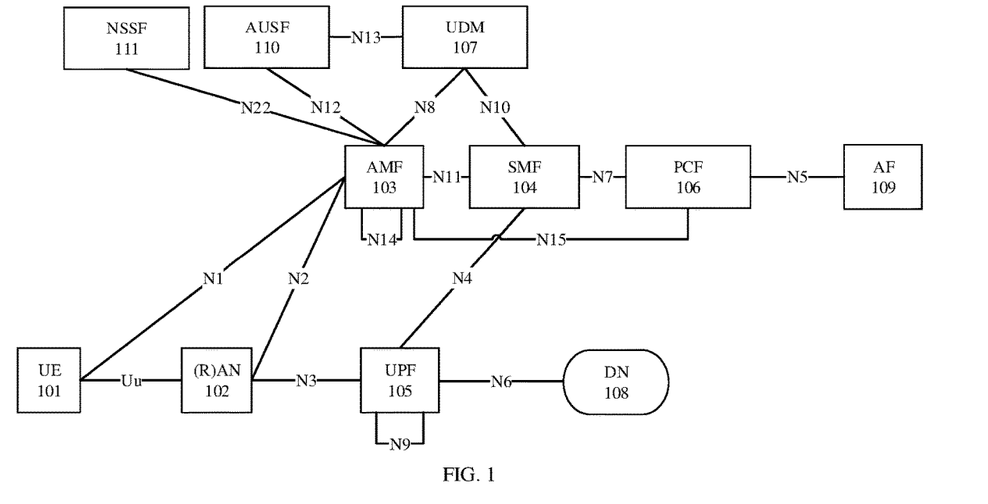
FIGS. 1 and 2 are schematic block diagrams showing system frameworks according to embodiments of the present disclosure.

FIG. 1 exemplarily shows a schematic diagram of a communication system 100 in which the present disclosure can be applied. As shown in FIG. 1, the communication system 100 mainly includes a terminal device (User Equipment, or UE) 101, an Access Network (AN) device 102, an Access and Mobility Management Function (AMF) entity 103, a Session Management Function (SMF) entity 104, a User Plane Function (UPF) entity 105, a Policy Control Function (PCF) entity 106, a Unified Data Management (UDM) entity 107, a Data Network (DN) 108, an Application Function (AF) entity 109, an Authentication Server Function (AUSF) entity 110, and a Network Slice Selection Function (NSSF) entity 111.

Specifically, in the communication system 100, the UE 101 establishes an access stratum connection with the AN device 102 via a Uu interface for access stratum message exchange and wireless data transmission, and the UE 101 establishes a Non-Access Stratum (NAS) connection with the AMF entity 103 via an N1 interface for NAS message exchange. The AN device 102 is connected to the AMF entity 103 via an N2 interface, and the AN device 102 is connected to the UPF entity 105 via an N3 interface. A plurality of UPF entities 105 are connected with each other via an N9 interface. The UPF entity 105 is connected to the DN 108 via an N6 interface. Meanwhile, the UPF entity 105 is connected to the SMF entity 104 via an N4 interface. The SMF entity 104 is connected to the PCF entity 106 via an N7 interface, the SMF entity 104 is connected to the UDM entity 107 via an N10 interface, and the SMF entity 104 controls the UPF entity 105 via the N4 interface. At the same time, the SMF entity 104 is connected to the AMF entity 103 via the N11 interface. A plurality of AMF entities 103 are connected with each other via an N14 interface, and the AMF entity 103 is connected to the UDM entity 107 via an N8 interface, the AMF entity 103 is connected to the AUSF entity 110 via an N12 interface, the AMF entity 103 is connected to the NSSF entity 111 via an N22 interface, and at the same time, the AMF entity 103 is connected to the PCF entity 106 via an N15 interface. The PCF entity 106 is connected to the AF entity 109 via an N5 interface. The AUSF entity 110 is connected to the UDM entity 107 via an N13 interface.

In the communication system 100, the UDM entity 107 is a subscription database in the core network, which stores subscription data of users in the 5G network. The AMF entity 103 is the mobility management function in the core network, and the SMF entity 104 is the session management function in the core network. In addition to performing mobility management for the UE 101, the AMF entity 103 is also responsible for forwarding session management related messages between the UE 101 and the SMF entity 104. The PCF entity 106 is a policy management function in the core network, responsible for formulating policies related to mobility management, session management, and charging for the UE 101. The UPF entity 105 is the user plane function in the core network, performs data transmission with the external data network via the N6 interface, and performs data transmission with the AN device 102 via the N3 interface. After the UE 101 accesses the 5G network via the Uu interface, a Protocol Data Unit (PDU) session data connection between the UE 101 and the UPF entity 105 is established under the control of the SMF entity 104, so as to perform data transmission. The AMF entity 103 and the SMF entity 104 obtain user subscription data from the UDM entity 107 via the N8 and N10 interfaces, and obtain policy data from the PCF entity 106 via the N15 and N7 interfaces, respectively.

In addition, there is a Network Exposure Function (NEF) entity in the communication system 100, which is configured to interface with a third-party application server, and perform information transfer between the core network nodes and the third-party application.

It should be noted that the above communication system 100 is described using the 5G communication system as an example. Of course, the present disclosure can also be applied to other 3GPP communication systems, such as the 4G communication system, or future 3GPP communication systems, and the present disclosure is not limited to this.

It can be appreciated that, in the embodiments of the present disclosure, a device having a communication function in a network/system may be referred to as a communication device.

It can be appreciated that the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

The embodiments of the present disclosure are described in conjunction with a network device and a terminal device. The terminal device may refer to a User Equipment (UE), an access terminal, a user unit, a user station, a mobile station, a remote station, a remote terminal, a mobile device, a user terminal, a terminal, a wireless communication device, a user agent, or a user device. The terminal device may be a station (ST) in a WLAN, a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal device in the next generation communication system (e.g., NR network), or a terminal device in a future evolved Public Land Mobile Network (PLMN), etc.

As non-limiting examples, in an embodiment of the present disclosure, the terminal device may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

The above AN device 102 may be a device communicating with mobile devices. The AN device 102 may be an Access Point (AP) in a WLAN, a base station such as Base Transceiver Station (BTS) in a GSM system or a CDMA system, a base station such as NodeB (NB) in a WCDMA system, a base station such as Evolutional Node (eNB or eNodeB) in an LTE system, or a relay station, an access point, a vehicle-mounted device, a wearable device, a base station (e.g., gNB) in an NR network, or a network device in a future evolved PLMN.

In the embodiment of the present disclosure, the network device may provide services for a cell, and the terminal device may communicate with the network device over transmission resources, e.g., frequency domain resources or frequency spectral resources, used in the cell. The cell may be a cell corresponding to the network device (e.g., base station). The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

The $5^{th}$ Generation (5G) mobile communication technology Industrial interest of Things (IIoT) needs to support transmission of services, such as factory automation, transport industry, and Electrical Power Distribution, in the 5G system. Based on its transmission requirements on delay and reliability, the IIoT introduces a concept of Time Sensitive Network (TSN) or Time Sensitive Communication (TSC). In the TSN, the 5G network will serve as a TSN bridge to provide services for TSN networks and services.

Figure 2:
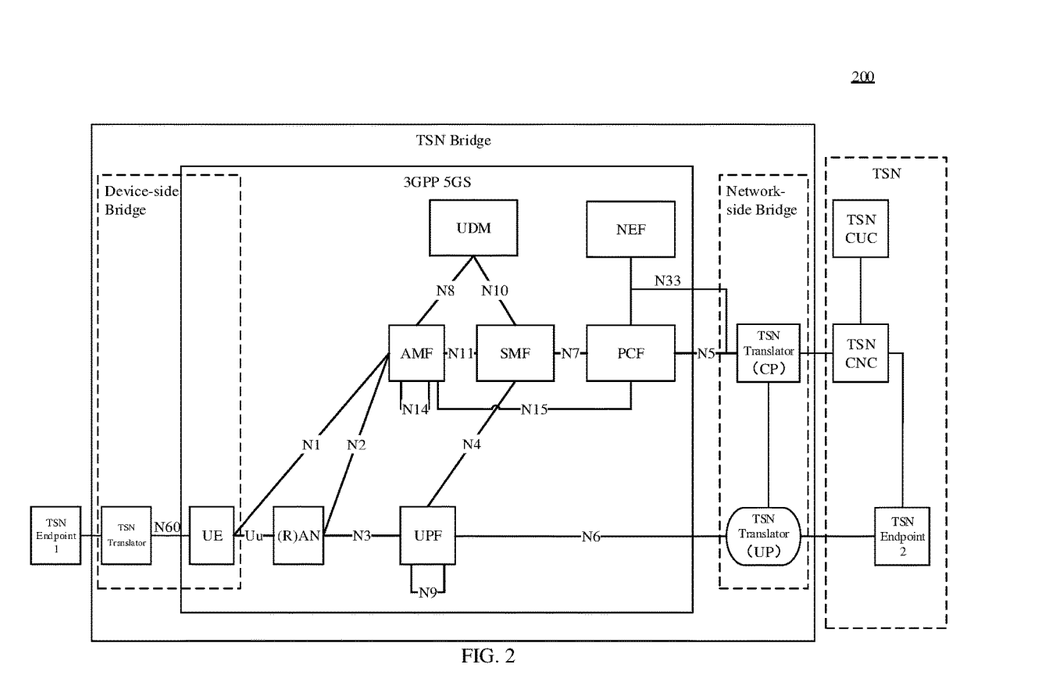

FIG. 2 is a block diagram of a system framework 200 according to an embodiment of the present disclosure.

As shown in FIG. 2, in the system framework 200, the 5G network will serve as a TSN bridge to provide services for TSN networks and services. Specifically, TSN Endpoint 1 can be connected to TSN Endpoint 2 in the TSN via a TSN bridge. The TSN bridge can include a device-side bridge and a network-side bridge. The device-side bridge can include a device-side TSN translator. The network-side bridge can include a network-side TSN translator (CP) and a TSN translator (UP). The TSN Endpoint 1 can be connected to the 3rd Generation Partnership Project (3GPP) 5G system (5GS) via the device-side TSN translator, so as to connect to the TSN translator (CP) and the TSN translator (UP) via the 3GPP 5GS. The 3GPP 5GS is connected to a TSN CNC via the TSN translator (CP), and the TSN Centralized Network Configuration (CNC) is connected to a TSN Centralized User Configuration (CUC) and TSN Endpoint 2. In addition, the 3GPP 5GS is connected to TSN Endpoint 2 via the TSN translator (UP). The TSN translator (CP) refers to the Control Plane (CP) TSN translator, and the TSN translator (UP) refers to the User Plane (UP) TSN translator. It should be understood that for the devices or network elements involved in the 3GPP 5GS, reference can be made to the relevant description in FIG. 1, and details thereof will be omitted here for brevity. In addition, the "connection" as used in the embodiment of the present disclosure is intended to indicate that two nodes can communicate with each other, and can be connected in a wired or wireless manner, and the embodiment of the present disclosure is not limited to this.

In the system framework 200, the New Radio (NR) system needs to provide a lower delay guarantee and a higher clock synchronization accuracy, such that when the factory automation service is transmitted in the 5G network, each point of the mechanical operation is accurate in terms of operability and continuity and meets the time requirement. Based on the requirement of the TSN service transmission, when the TSN service is transmitted in 5G, it needs to meet the time synchronization accuracy requirement of 1 us. However, there is currently no specific solution on how to achieve clock synchronization and meet a synchronization accuracy requirement.

Figure 3:
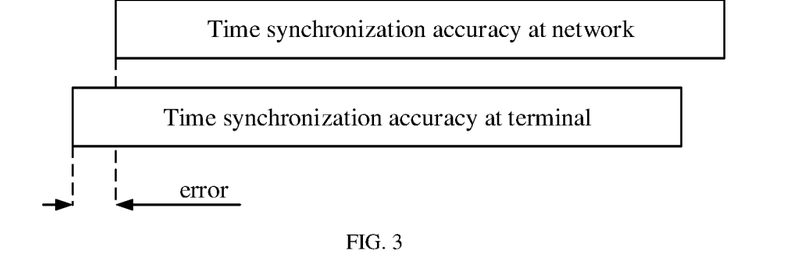
FIG. 3 is a schematic diagram showing an error between a time synchronization accuracy at a network and a time synchronization accuracy at a terminal according to an embodiment of the present disclosure.

FIG. 3 is a schematic diagram of a clock synchronization timing relationship between a network device and a terminal device according to an embodiment of the present disclosure.

As shown in FIG. 3, from the perspective of the air interface, whether the 1 us time synchronization accuracy requirement can be met, i.e., whether the synchronization error between the clock synchronization timing at the network and the time synchronization timing at the User Equipment (UE) can meet the 1 us time synchronization accuracy requirement, is dependent on the error between the time synchronization accuracy notified by the network and the time synchronization accuracy at the terminal. The time synchronization information and time synchronization accuracy information notified by the network device may be contained in a time reference information element (TimeReferenceInfo IE).

Since the synchronization error at the UE is determined by the Radio Access Network (RAN), and the error is dependent on many factors such as propagation loss and device constraints, the present disclosure provides a wireless communication method, a first device and a second device, capable of achieving clock synchronization and meeting the synchronization accuracy requirement by introducing a first time length and determining a delay compensation amount and/or a Timing Advance (TA) value based on the first time length.

Figure 4:
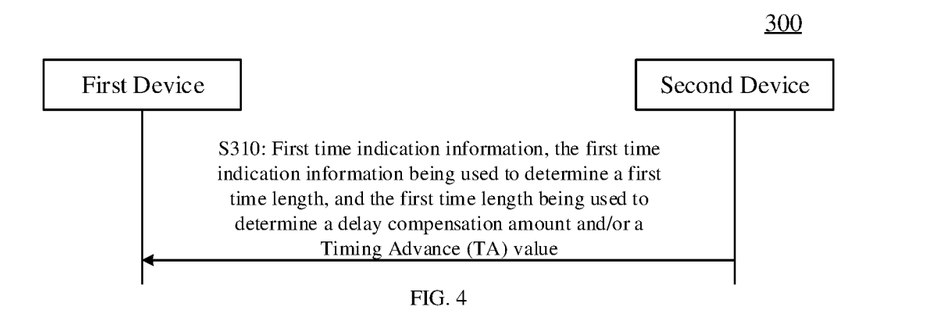
FIG. 4 is a schematic flowchart illustrating a wireless communication method according to an embodiment of the present disclosure.

FIG. 4 shows a schematic flowchart illustrating a wireless communication method 300 according to an embodiment of the present disclosure, and the method 300 may be performed interactively by a first device and a second device. The first device may be the terminal device shown in FIG. 1 or FIG. 2, and the second device may be the access network device shown in FIG. 1 or FIG. 2. Alternatively, the first device may be the access network device shown in FIG. 1 or FIG. 2, and the second device may be the terminal device shown in FIG. 1 or FIG. 2. Of course, both the first device and the second device may be the terminal device or the access network device shown in FIG. 1 or FIG. 2, and the embodiment of the present disclosure is not limited to any of these.

As shown in FIG. 4, the method 300 may include:

At S310, the first device receives first time indication information, the first time indication information being used to determine a first time length, and the first time length being used to determine a delay compensation amount and/or a TA value.

For example, the first device receives the first time indication information transmitted by the second device, such that the first device can determine the first time length based on the first time indication information, and then determine the delay compensation amount and/or the TA value based on the first time length. For example, if the first time length is used to determine the TA value, then TA=TA_offset+N_TA, where TA_offset is a TA_offset, and the first time length may correspond to N_TA. That is, the first time length in the present disclosure is independent of TA_offset. In another example, if the first time length is used to determine the delay compensation amount, the delay compensation amount may be used to correct a transmission delay. For example, the delay compensation amount=TA_offset+first time length, or the delay compensation amount=first time length.

In the present disclosure, the first time indication information can be used to compensate the propagation delay, such that the time synchronization accuracy error of the physical layer can be within the required range. In other words, the first time indication information can be equivalent to signaling of the propagation delay compensation amount or signaling for calculation of the propagation delay compensation amount. That is, a certain calculation accuracy can be guaranteed by means of signaling exchange. In addition, calculating the TA value based on the first time indication information can ensure clock synchronization. Based on this, in the embodiment of the present disclosure, the first device receives the first time indication information and determines the delay compensation amount and TA value based on the first time length determined from the first time indication information, so as to achieve clock synchronization and meet the synchronization accuracy requirement.

In some embodiments of the present disclosure, the first time indication information may indicate a time length based on a first accuracy, and the first accuracy may be configured or predefined. The first accuracy may be configured by a network device or a network. The first accuracy may be one of one or more accuracies.

In some embodiments of the present disclosure, the first accuracy may be a*T, where T is a sample length and a is a positive integer.

In the embodiments of the present disclosure, "predefined" may implemented as pre-stored in one or more devices (for example, including a terminal device and a network device) corresponding codes, tables or other means that can be used to indicate related information, and the present disclosure is not limited to its specific implementation. For example, "predefined" may refer to defined in protocols. In the embodiments of the present disclosure, "protocols" may refer to standard protocols in the communication field, including e.g., the LTE protocol, the NR protocol, and related protocols applied in future communication systems. The present disclosure is not limited to any of these examples. The term "configuration" may refer to a dynamic configuration, a static configuration or a semi-static configuration. Of course, for "predefined" and "configuration" used hereinafter, reference can be made to the above description and details thereof will be omitted.

In addition, T may be denoted as Tc in the protocol, and the sample length may also be referred to as the time length corresponding to the sample, which may be a symbol length or another form of length, and the embodiment of the present disclosure is not limited to this.

In some embodiments of the present disclosure, the first time indication information may indicate an absolute value of the first time length.

In some embodiments of the present disclosure, the first time indication information may indicate a relative value of the first time length.

In an implementation, the first time length may be equal to a sum of a first historical time length and the relative value, the first historical time length being equal to a latest delay compensation amount and/or TA value before the first device receives the first time indication information. Optionally, there may be no delay compensation amount and/or TA value before the first device receives the first time indication information, and the first historical time length may be equal to 0.

In an implementation, there may be no delay compensation amount and/or TA value before the first device receives the first time indication information, and the first time length may be equal to the relative value.

It can be appreciated that the term "indication" as used in the embodiments of the present disclosure may be a direct indication, an indirect indication, or an association. For example, if A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

In addition, the term "absolute value" used in the embodiments of the present disclosure may be understood as: the first time length is equal to the time length indicated by the first time indication information, or the first time length is directly determined based on the first time indication information. The term "relative value" can be understood as: the difference between the first time length and another time length, for example, the difference between the first time length and the first historical time length, i.e., the first time length is determined based on the time length indicated by the first time indication information and the first historical time length.

In some embodiments of the present disclosure, the first time length may be a time length corresponding to a first process, and the first process may include a process for determining a delay compensation amount and/or a process for determining a TA value. Optionally, the first process may be configured or predefined.

In some embodiments of the present disclosure, the first time length may be a time length corresponding to a first process, and the first process may be a process for determining a delay compensation amount, and the method 300 may further include:

determining, by the first device when the first process is not later than first reference time, the first time length based on the first time indication information, the first reference time being time at which the first device receives first TA indication information after receiving the first time indication information, or time between time at which the first device receives the first time indication information and time at which the first device receives the first TA indication information. Optionally, time at which the first device determines the first time length based on the first time indication information may not be later than the first reference time.

In some embodiments of the present disclosure, the first time length may be a time length corresponding to a first process, and the first process may be a process for determining a delay compensation amount, and the method 300 may further include:

determining, by the first device when a TA value corresponding to the first process is same as a TA value corresponding to a transmission process of the first time indication information, the first time length based on the first time indication information. That is, the TA value corresponding to the first process is same as the TA value corresponding to the transmission process of the first time indication information. For example, when the TA value corresponding to the first process, the TA value corresponding to the transmission process of the first time indication information, and a TA value corresponding to a process of measuring the first time length by the second device are all same, the first device may determine the first time length based on the first time indication information. That is, the TA value corresponding to the first process, the TA value corresponding to the transmission process of the first time indication information, and the TA value corresponding to the process of measuring the first time length by the second device are all same. Optionally, the TA value corresponding to the first process may refer to a TA value corresponding to a time range from time at which the first device receives the first time indication information to time at which the first device determines the first time length. Optionally, the TA value corresponding to the transmission process of the first time indication information may refer to a TA value corresponding to a time range from time at which a second device measures the first time length to time at which the first device receives the first time indication information.

In the embodiment of the present disclosure, it is intended to illustrate that the first device and the second device correspond to the same TA value in the time periods during which the time difference (time diff) belongs to the same TA value, that is, the time period during which the second device measures the first time length and the time period during which the second device transmits the first time indication information, and the time period during which the first device obtains the first time length based on the first time indication information.

In some embodiments of the present disclosure, the first device is may be a terminal device or a network device.

The solutions of the present disclosure will be described below in conjunction with specific embodiments.

Embodiment 1

The first time indication information transmitted by the second device is used in the first process, the first process is a process for determining the delay compensation amount, and the first time length is the delay compensation amount. The indication accuracy of the first time indication information as agreed in the protocol is $a*T$, where T is a sample length, and a is a positive integer. The first device receives the first time indication information, and the value indicated by the first time indication information is N. Based on this, the first time length can be determined based on N, and the delay compensation amount can be calculated using the first time length. There are two methods for the first device to determine the delay compensation amount as follows:

Method 1:

The first time indication information directly indicates the first time length, and the first time length is $N*a*T$. That is, the delay compensation amount is $N*a*T$. In short, the propagation delay is compensated by using $N*a*T$ as the delay compensation amount.

Method 2:

The first time indication information indicates an adjustment amount of the first time length, then the first time length is $T_{old}+N*a*T$. That is, the delay compensation amount is $T_{old}+N*a*T$, where $T_{old}$ is the delay compensation amount before the first time indication information is received. If there is no delay compensation amount before the first time indication information is received, then $T_{old}=0$. In short, the propagation delay is compensated by using $T_{old}+N*a*T$ as the delay compensation amount.

Embodiment 2

The first time indication information transmitted by the second device is used in the first process, the first process is a process of determining a timing advance, and the first time length is the TA value. The indication accuracy of the first time indication information as agreed in the protocol is $a*T$, where T is the sample length, and a is a positive integer. The first device receives the first time indication information, and the value indicated by the first time indication information is N. Based on this, the first time length may be determined based on N, and the TA value may be determined using the first time length. There are two methods for the first device to determine the TA value as follows:

Method 1:

The first time indication information directly indicates the first time length, and the first time length is N*a*T. That is, the timing advance is N*a*T. In short, N*a*T I is used as the TA value for clock synchronization.

Method 2:

The first time indication information indicates an adjustment amount of the first time length, and the first time length is $TA_{old}$+N*a*T. That is, the TA value is $TA_{old}$+N*a*T, where $TA_{old}$ is the timing advance before the first time indication information is received. If there is no timing advance before the first time indication message is received, then $TA_{old}$=0. In short, $TA_{old}$+N*a*T is used as the TA value for clock synchronization.

Embodiment 3

The first time indication information transmitted by the second device is used in the first process, the first process is a process for determining the delay compensation amount, and the first time length is the delay compensation amount. The indication accuracy of the first time indication information as agreed in the protocol is a*T, where T is the sample length, and a is a positive integer. The first device receives the first time indication information, and the value indicated by the first time indication information is N. Based on this, the first time length can be determined based on N, and the delay compensation amount can be calculated using the first time length.

Figure 5:
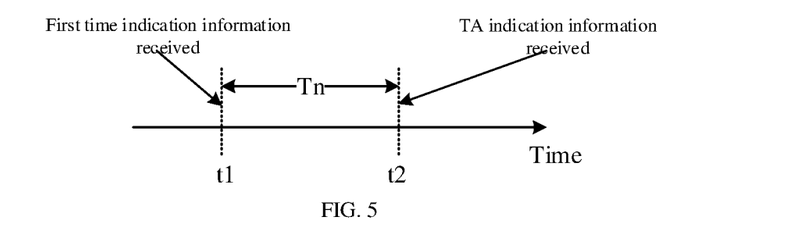
FIGS. 5 and 6 are schematic diagrams showing structures of timing positions of first time indication information according to an embodiment of the present disclosure.

FIG. 5 is a schematic diagram showing a timing position of the first time indication information according to an embodiment of the present disclosure.

As shown in FIG. 5, it is assumed that the first device receives the first time indication information at time t1, and receives the TA indication information at time t2, and t1 is not later than t2. Then before t2, that is, within the time range Tn shown in FIG. 2, the first device may use the first time length to calculate the propagation delay compensation amount.

Embodiment 4

The first time indication information transmitted by the second device is used in the first process, the first process is a process for determining the delay compensation amount, and the first time length is the delay compensation amount. The indication accuracy of the first time indication information as agreed in the protocol is a*T, where T is the sample length, and a is a positive integer. The first device receives the first time indication information, and the value indicated by the first time indication information is N. Based on this, the first time length can be determined based on N, and the delay compensation amount can be calculated using the first time length.

Figure 6:
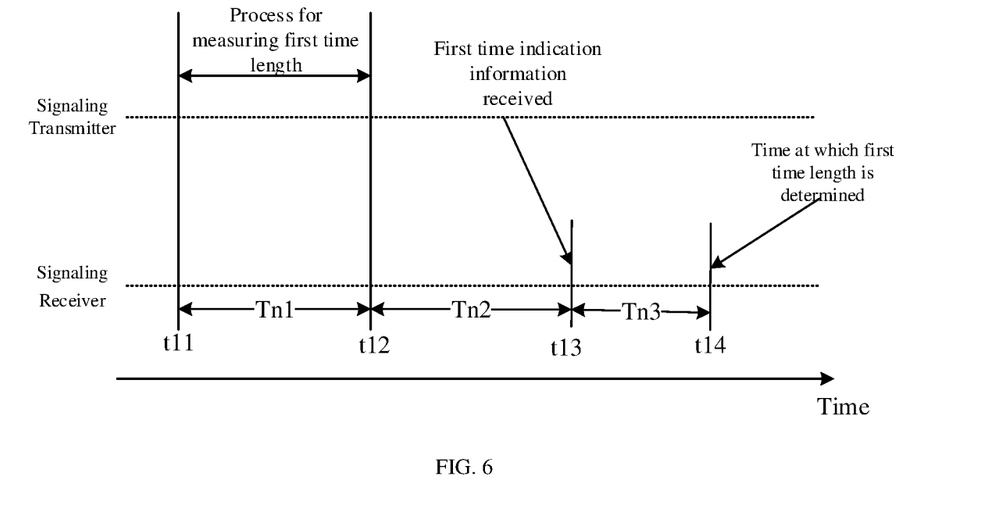

FIG. 6 is another schematic diagram showing a timing position of the first time indication information according to an embodiment of the present disclosure.

As shown in FIG. 6, it is assumed that from time t11 to t12, that is, within the time range Tn1, the second device measures the first time length. At time t13, the first device receives the first time indication information, and at time t14, the first device determines the first time length based on the first time indication information. In this case, the corresponding TA value TA1 between t11 and t12 does not change, the corresponding TA value TA2 between t12 and t13 does not change, and the values of TA1 and TA2 are the same. The first device can use the first time length to calculate the propagation delay compensation amount. Alternatively, the corresponding TA value TA1 between t11 and t12 does not change, the corresponding TA value TA2 between t12 and t13 does not change, the corresponding TA value TA3 between t13 and t14 does not change, and the values of TA1, TA2 and TA3 are the same. The first device can use the first time length to calculate the propagation delay compensation amount.

The preferred embodiments of the present disclosure have been described in detail above with reference to the accompanying drawings. However, the present disclosure is not limited to the specific details of the above embodiments. Various simple modifications can be made to the technical solutions of the present disclosure without departing from the scope of the technical concept of the present disclosure. These simple modifications all belong to the protection scope of the present disclosure. For example, the specific technical features described in the above specific embodiments can be combined as appropriate provided that they do not conflict. In order to avoid unnecessary repetition, the description of various possible combinations will be omitted here. In another example, the embodiments of the present disclosure can also be combined as appropriate, as long as they do not violate the concept of the present disclosure, and they should also be regarded as the content disclosed in the present disclosure.

It should also be understood that, in the method embodiments of the present disclosure, the values of the sequence numbers of the above processes do not mean the order of execution, and the execution order of each process should be determined by its functions and internal logics, and the implementation of the present disclosure is not limited to any specific order. In addition, in this embodiment of the present disclosure, the term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

The method embodiments of the present disclosure have been described in detail above, and the apparatus embodiments of the present disclosure will be described in detail below with reference to FIGS. 7 to 10.

Figure 7:
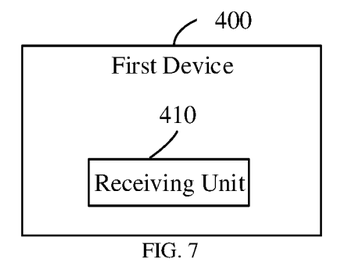
FIG. 7 is a schematic block diagram of a first device according to an embodiment of the present disclosure.

FIG. 7 is a schematic block diagram of a first device 400 according to an embodiment of the present disclosure.

As shown in FIG. 7, the first device 400 may include:

a receiving unit 410 configured to receive first time indication information, the first time indication information being used to determine a first time length, and the first time length being used to determine a delay compensation amount and/or a Timing Advance (TA) value.

In some embodiments of the present disclosure, the first time indication information may indicate a time length based on a first accuracy, the first accuracy being configured or predefined.

In some embodiments of the present disclosure, the first accuracy may be a*T, where T is a sample length and a is a positive integer.

In some embodiments of the present disclosure, the first time indication information may indicate an absolute value of the first time length.

In some embodiments of the present disclosure, the first time indication information may indicate a relative value of the first time length.

In some embodiments of the present disclosure, the first time length may be equal to a sum of a first historical time length and the relative value, the first historical time length being equal to a latest delay compensation amount and/or TA value before the first device receives the first time indication information.

In some embodiments of the present disclosure, there may be no delay compensation amount and/or TA value before the first device receives the first time indication information, and the first historical time length is equal to 0.

In some embodiments of the present disclosure, there may be no delay compensation amount and/or TA value before the first device receives the first time indication information, and the first time length is equal to the relative value.

In some embodiments of the present disclosure, the first time length may be a time length corresponding to a first process, and the first process may include a process for determining a delay compensation amount and/or a process for determining a TA value.

In some embodiments of the present disclosure, the first process may be configured, or the first process may be predefined.

In some embodiments of the present disclosure, the first time length may be a time length corresponding to a first process, and the first process may be a process for determining a delay compensation amount, the receiving unit 410 may be further configured to:
determine, when the first process is not later than first reference time, the first time length based on the first time indication information, the first reference time being time at which the first device receives first TA indication information after receiving the first time indication information, or time between time at which the first device receives the first time indication information and time at which the first device receives the first TA indication information.

In some embodiments of the present disclosure, time at which the first device determines the first time length based on the first time indication information may not be later than the first reference time.

In some embodiments of the present disclosure, the first time length may be a time length corresponding to a first process, and the first process may be a process for determining a delay compensation amount, and the receiving unit 410 may be further configured to:
determine, when a TA value corresponding to the first process is same as a TA value corresponding to a transmission process of the first time indication information, the first time length based on the first time indication information.

In some embodiments of the present disclosure, the receiving unit 410 may be configured to:
determine, when the TA value corresponding to the first process, the TA value corresponding to the transmission process of the first time indication information, and a TA value corresponding to a process of measuring the first time length by a second device are all same, the first time length based on the first time indication information.

In some embodiments of the present disclosure, the TA value corresponding to the first process may refer to a TA value corresponding to a time range from time at which the first device receives the first time indication information to time at which the first device determines the first time length.

In some embodiments of the present disclosure, the TA value corresponding to the transmission process of the first time indication information may refer to a TA value corresponding to a time range from time at which a second device measures the first time length to time at which the first device receives the first time indication information.

In some embodiments of the present disclosure, the first device may be a terminal device or a network device.

Figure 8:
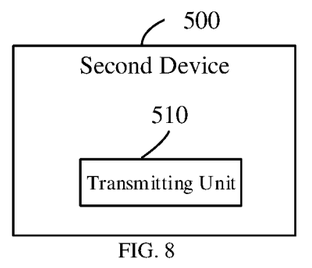
FIG. 8 is a schematic block diagram of a second device according to an embodiment of the present disclosure.

FIG. 8 is a schematic block diagram of a second device 500 according to an embodiment of the present disclosure.

As shown in FIG. 8, the second device 500 may include:
a transmitting unit 510 configured to transmit first time indication information, the first time indication information being used to determine a first time length, and the first time length being used to determine a delay compensation amount and/or a Timing Advance (TA) value.

In some embodiments of the present disclosure, the first time indication information may indicate a time length based on a first accuracy, the first accuracy being configured or predefined.

In some embodiments of the present disclosure, the first accuracy may be a*T, where T is a sample length and a is a positive integer.

In some embodiments of the present disclosure, the first time indication information may indicate an absolute value of the first time length.

In some embodiments of the present disclosure, the first time indication information may indicate a relative value of the first time length.

In some embodiments of the present disclosure, the first time length may be equal to a sum of a first historical time length and the relative value, the first historical time length being equal to a latest delay compensation amount and/or TA value before the first device receives the first time indication information.

In some embodiments of the present disclosure, there may be no delay compensation amount and/or TA value before the first device receives the first time indication information, and the first historical time length is equal to 0.

In some embodiments of the present disclosure, there may be no delay compensation amount and/or TA value before the first device receives the first time indication information, and the first time length is equal to the relative value.

In some embodiments of the present disclosure, the first time length may be a time length corresponding to a first process, and the first process comprises a process for determining a delay compensation amount and/or a process for determining a TA value.

In some embodiments of the present disclosure, the first process may be configured, or the first process may be predefined.

In some embodiments of the present disclosure, the first time length may be a time length corresponding to a first process, the first process may be a process for determining a delay compensation amount, the first process may not be later than first reference time, and the first reference time may be time at which the first device receives first TA indication information after receiving the first time indication information.

In some embodiments of the present disclosure, time at which the first device determines the first time length based on the first time indication information may not be later than the first reference time.

In some embodiments of the present disclosure, the first time length is a time length corresponding to a first process, the first process is a process for determining the delay compensation amount, and a TA value corresponding to the first process is same as a TA value corresponding to a transmission process of the first time indication information.

In some embodiments of the present disclosure, the TA value corresponding to the first process, the TA value corresponding to the transmission process of the first time indication information, and a TA value corresponding to a process of measuring the first time length by a second device may all be same.

In some embodiments of the present disclosure, the TA value corresponding to the first process may refer to a TA value corresponding to a time range from time at which the first device receives the first time indication information to time at which the first device determines the first time length.

In some embodiments of the present disclosure, the TA value corresponding to the transmission process of the first time indication information may refer to a TA value corresponding to a time range from time at which a second device measures the first time length to time at which the first device receives the first time indication information.

In some embodiments of the present disclosure, the second device may be a terminal device or a network device.

It should be understood that the apparatus embodiments and the method embodiments may correspond to each other, and for similar descriptions, reference can be made to the method embodiments. In particular, the first device 400 as shown in FIG. 7 may correspond to the corresponding entity for performing the method 300 according to the embodiment of the present disclosure, and the above and other operations and/or functions of the respective units in the first device 400 are provided for implementing the corresponding processes in the respective methods in FIG. 4. Similarly, the second device 500 as shown in FIG. 8 may correspond to the corresponding entity for performing the method 300 according to the embodiment of the present disclosure, and the above and other operations and/or functions of the respective units in the second device 500 are provided for implementing the corresponding processes in the respective methods in FIG. 4. For brevity, details thereof will be omitted here.

The communication device according to the embodiment of the present disclosure has been described above from the perspective of functional modules with reference to the accompanying drawings. It should be understood that the functional modules can be implemented in the form of hardware, software instructions, or a combination of hardware and software modules.

Specifically, the steps of the method embodiments in the embodiments of the present disclosure may be implemented by hardware integrated logic circuits in the processor and/or software instructions, and the steps of the methods disclosed in conjunction with the embodiments of the present disclosure may be directly embodied as implemented by a hardware decoding processor or a combination of hardware and software modules in a decoding processor.

Optionally, the software modules may be located in a random access memory, a flash memory, a read-only memory, a programmable read-only memory, an electrically erasable programmable memory, a register, and other storage media known in the art. The storage medium is located in the memory, and the processor reads the information in the memory, and performs the steps in the above method embodiments in combination with its hardware.

For example, the processing unit and the communication unit above may be implemented by a processor and a transceiver, respectively.

Figure 9:
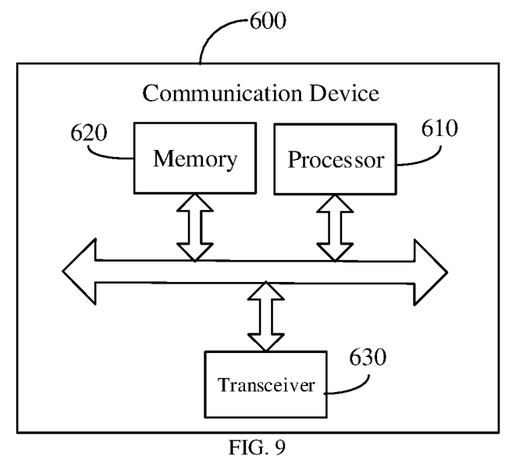
FIG. 9 is a schematic block diagram of a communication device according to an embodiment of the present disclosure.

FIG. 9 is a schematic diagram showing a structure of a communication device 600 according to an embodiment of the present disclosure.

As shown in FIG. 9, the communication device 600 includes a processor 610.

Here, the processor 610 can invoke and execute a computer program from a memory to implement the method in the embodiment of the present disclosure.

Referring to FIG. 9 again, the communication device 600 may further include a memory 620.

Here, the memory 620 may store indication information, and may further store codes, instructions, etc. to be executed by the processor 610. The processor 610 can invoke and execute a computer program from the memory 620 to implement the method in the embodiment of the present disclosure. The memory 620 may be a separate device independent from the processor 610, or may be integrated in the processor 610.

Referring to FIG. 9 again, the communication device 600 may further include a transceiver 630.

Here, the processor 610 may control the transceiver 630 to communicate with other devices, and in particular, transmit information or data to other devices, or receive information or data transmitted by other devices.

The transceiver 630 may include a transmitter and a receiver. The transceiver 630 may further include one or more antennas.

It can be appreciated that the components in the communication device 600 may be connected via a bus system. Here, the bus system may include a power bus, a control bus and a status signal bus, in addition to a data bus.

It can be appreciated that the communication device 600 may be the first device according to the embodiment of the present disclosure, and the communication device 600 may implement the corresponding processes implemented by the device terminal in any of the methods according to the embodiments of the present disclosure. That is, the communication device 600 in the embodiment of the present disclosure may correspond to the first device 400 in the embodiment of the present disclosure, and may correspond to the corresponding entity that performs the method according to the embodiment of the present disclosure. The transceiver 603 here may correspond to the operations and/or functions implemented by the receiving unit 410 in the first device 400. For the sake of brevity, details thereof will be omitted here. Similarly, the communication device 600 may be the second device according to the embodiment of the present disclosure, and the communication device 600 may implement the corresponding processes implemented by the second device in any of the methods according to the embodiments of the present disclosure. That is, the communication device 600 in the embodiment of the present disclosure may correspond to the second device 500 in the embodiment of the present disclosure, and may correspond to the corresponding entity that performs the method according to the embodiment of the present disclosure. The transceiver 603 here may correspond to the operations and/or functions implemented by the transmitting unit 510 in the second device 500. For the sake of brevity, details thereof will be omitted here.

In addition, an embodiment of the present disclosure also provides a chip.

For example, the chip may be an integrated circuit chip, which has a signal processing capability, and can implement or perform any of the methods, steps, and logic block diagrams disclosed in the embodiments of the present disclosure. The chip may also be referred to as a system level chip, a system chip, a chip system, a system-on-a-chip, or the like. Optionally, the chip can be applied in various communication devices, such that the communication device installed with the chip can perform the methods, steps and logic block diagrams disclosed in the embodiments of the present disclosure.

Figure 10:
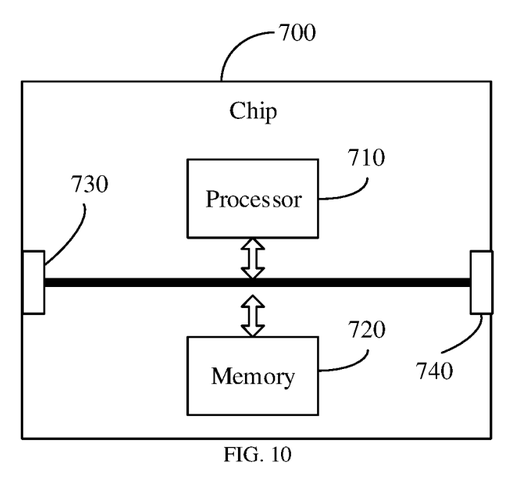
FIG. 10 is a schematic block diagram of a chip according to an embodiment of the present disclosure.

FIG. 10 is a schematic diagram showing a structure of a chip 700 according to an embodiment of the present disclosure.

As shown in FIG. 10, the chip 700 includes a processor 710.

Here, the processor 710 can invoke and execute a computer program from a memory to implement the method in the embodiment of the present disclosure.

Referring to FIG. 10 again, the chip 700 may further include a memory 720.

Here, the processor 710 can invoke and execute a computer program from the memory 720 to implement the method in the embodiment of the present disclosure. The memory 720 may store indication information, and may further store codes, instructions, etc. to be executed by the processor 710. The memory 720 may be a separate device independent from the processor 710, or may be integrated in the processor 710.

Referring to FIG. 10 again, the chip 700 may further include an input interface 630.

Here, the processor 710 can control the input interface 730 to communicate with other devices or chips, and in particular, obtain information or data transmitted by other devices or chips.

Referring to FIG. 10 again, the chip 700 may further include an output interface 640.

Here, the processor 710 can control the output interface 740 to communicate with other devices or chips, and in particular, output information or data to other devices or chips.

It can be appreciated that the chip 700 may be applied in the network device according to the embodiment of the present disclosure, and the chip may implement the corresponding processes implemented by the first device in any of the methods according to the embodiments of the present disclosure, or the corresponding processes implemented by the second device in any of the methods according to the embodiments of the present disclosure. For the sake of brevity, details thereof will be omitted here.

It can be appreciated that the components in the chip 700 may be connected via a bus system. Here, the bus system may include a power bus, a control bus and a status signal bus, in addition to a data bus.

The above processor may include, but not limited to, a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed by the processor. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, erasable programmable memory, or register. The storage medium can be located in the memory, and the processor can read information from the memory and perform the steps of the above methods in combination with its hardware.

The above memory may include, but not limited to, a volatile memory and/or a non-volatile memory. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM).

It is to be noted that the memory used for the system and method described in the present disclosure is intended to include these and any other suitable types of memories.

An embodiment of the present disclosure also provides a computer readable storage medium for storing a computer program. The computer readable storage medium stores one or more programs including instructions which, when executed by a portable electronic device including a plurality of application programs, enable the portable electronic device to perform the method according to any of the method embodiments.

Optionally, the computer readable storage medium may be applied to the first device in the embodiment of the present disclosure, and the computer program causes the computer to execute the corresponding process implemented by the first device in any of the methods according to the embodiments of the present disclosure. For the sake of brevity, details thereof will be omitted here. Optionally, the computer readable storage medium can be applied to the second device in the embodiment of the present disclosure, and the computer program causes the computer to execute the corresponding process implemented by the second device in any of the methods according to the embodiments of the present disclosure. For the sake of brevity, details thereof will be omitted here.

An embodiment of the present disclosure also provides a computer program product including a computer program.

Optionally, the computer program product can be applied to the first device in the embodiment of the present disclosure, and the computer program can cause a computer to perform corresponding procedures implemented by the first device in the method according to any of the embodiments of the present disclosure. Details thereof will be omitted here for simplicity. Optionally, the computer program product can be applied to the second device in the embodiment of the present disclosure, and the computer program can cause a computer to perform corresponding procedures implemented by the second device in the method according to any of the embodiments of the present disclosure. Details thereof will be omitted here for simplicity.

An embodiment of the present disclosure also provides a computer program which, when executed by a computer, causes the computer to perform the method according to any of the method embodiments.

Optionally, the computer program can be applied to the first device in the embodiment of the present disclosure. The computer program, when executed by a computer, can cause the computer to perform corresponding procedures implemented by the first device in the method according to any of the embodiments of the present disclosure. Details thereof will be omitted here for simplicity. Optionally, the computer program can be applied to the second device in the embodiment of the present disclosure. The computer program, when executed on a computer, can cause the computer to perform corresponding procedures implemented by the second device in the method according to any of the embodiments of the present disclosure. Details thereof will be omitted here for simplicity.

In addition, an embodiment of the present disclosure further provides a communication system, which may include the above first device and the second device to form the communication system as shown in FIG. 1. Details thereof will be omitted here for simplicity. It should be noted that the term "system" and the like as used herein may also be referred to as "network management architecture" or "network system" or the like.

It should also be understood that the terms used in the embodiments of the present disclosure and the claims as attached are only for the purpose of describing specific embodiments, and are not intended to limit the embodiments of the present disclosure. For example, as used in the embodiments of the present disclosure and the claims as attached, the singular forms "a," "the," "above," and "said" are intended to include the plural forms as well, unless the context clearly indicates otherwise.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of the embodiments of the present disclosure.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

It can be appreciated by those skilled in the art that, for the convenience and brevity of description, for the specific operations and processes of the system, apparatus and unit as described above, reference can be made to the corresponding processes in the above method embodiments, and details thereof will be omitted.

In the embodiments of the present disclosure, it can be appreciated that the disclosed systems, devices, and methods may be implemented in other ways. For example, the divisions of the units or modules or components as described above are only divisions based on logical functions, and there may be other divisions in actual implementations. For example, more than one unit or module or component may be combined or integrated into another system, or some units or modules or components can be ignored or omitted. In another example, the units/modules/components described above as separate/explicit components may or may not be physically separated, that is, they may be co-located or distributed across a number of network elements. Some or all of the units/modules/components may be selected according to actual needs to achieve the objects of the embodiments of the present disclosure.

While the specific embodiments of the present disclosure have been described above, the scope of the embodiments of the present disclosure is not limited to these embodiments. Various variants and alternatives can be made by those skilled in the art without departing from the scope of the embodiments of the present disclosure. These variants and alternatives are to be encompassed by the scope of the embodiments of present disclosure as defined by the claims as attached.

What is claimed is:

1. A wireless communication method, comprising:
receiving, by a first device, first time indication information, the first time indication information being used to determine a first time length, and the first time length being used to determine a delay compensation amount and/or a Timing Advance (TA) value;
wherein the first time length is a time length corresponding to a first process, and the first process is a process for determining the delay compensation amount, and the method further comprises:
determining, by the first device when a TA value corresponding to the first process, a TA value corresponding to a transmission process of the first time indication information, and a TA value corresponding to a process of measuring the first time length by a second device are all same, the first time length based on the first time indication information.

2. The method according to claim 1, wherein the first time indication information indicates a time length based on a first accuracy, the first accuracy being configured or predefined.

3. The method according to claim 2, wherein the first accuracy is a*T, where T is a sample length and a is a positive integer.

4. The method according to claim 1, wherein the first time indication information indicates an absolute value of the first time length.

5. The method according to claim 1, wherein the first time indication information indicates a relative value of the first time length.

6. The method according to claim 1, wherein the first process further comprises a process for determining a process for determining the TA value.

7. The method according to claim 1, the method further comprises:
determining, by the first device when the first process is not later than first reference time, the first time length based on the first time indication information, the first reference time being time at which the first device receives first TA indication information after receiving the first time indication information, or time between time at which the first device receives the first time indication information and time at which the first device receives the first TA indication information,
wherein time at which the first device determines the first time length based on the first time indication information is not later than the first reference time.

8. A first device, comprising a processor, a memory, and a transceiver, wherein the memory has a computer program stored thereon, and the processor is configured to invoke and execute the computer program stored in the memory to control the transceiver to:
- receive first time indication information, the first time indication information being used to determine a first time length, and the first time length being used to determine a delay compensation amount and/or a Timing Advance (TA) value;
- wherein the first time length is a time length corresponding to a first process, the first process is a process for determining the delay compensation amount, and the processor is further configured to invoke and execute the computer program stored in the memory to perform:
- determine, when the TA value corresponding to the first process, the TA value corresponding to the transmission process of the first time indication information, and a TA value corresponding to a process of measuring the first time length by a second device are all same, the first time length based on the first time indication information.

9. The first device according to claim 8, wherein the first time indication information indicates a time length based on a first accuracy, the first accuracy being configured or predefined.

10. The first device according to claim 9, wherein the first accuracy is a*T, where T is a sample length and a is a positive integer.

11. The first device according to claim 8, wherein the first time indication information indicates an absolute value of the first time length.

12. The first device according to claim 8, wherein the first time indication information indicates a relative value of the first time length.

13. The first device according to claim 8, wherein the first process further comprises a process for determining a process for determining the TA value.

14. The first device according to claim 8, wherein the processor is further configured to invoke and execute the computer program stored in the memory to perform:
- determine, when the first process is not later than first reference time, the first time length based on the first time indication information, the first reference time being time at which the first device receives first TA indication information after receiving the first time indication information, or time between time at which the first device receives the first time indication information and time at which the first device receives the first TA indication information,
- wherein time at which the first device determines the first time length based on the first time indication information is not later than the first reference time.

15. A second device, comprising a processor, a memory, and a transceiver, wherein the memory has a computer program stored thereon, and the processor is configured to invoke and execute the computer program stored in the memory to control the transceiver to:
- transmit first time indication information, the first time indication information being used to determine a first time length, and the first time length being used to determine a delay compensation amount and/or a Timing Advance (TA) value;
- wherein the first time length is a time length corresponding to a first process, the first process is a process for determining the delay compensation amount, and when the TA value corresponding to the first process, the TA value corresponding to the transmission process of the first time indication information, and a TA value corresponding to a process of measuring the first time length by a second device are all same, the first time length is determined based on the first time indication information.

16. The second device according to claim 15, wherein the first time indication information indicates a time length based on a first accuracy, the first accuracy being configured or predefined.

17. The second device according to claim 16, wherein the first accuracy is a*T, where T is a sample length and a is a positive integer.

18. The second device according to claim 15, wherein the first time indication information indicates an absolute value of the first time length.

19. The second device according to claim 15, wherein the first time indication information indicates a relative value of the first time length.

20. The second device according to claim 15, wherein the first process further comprises a process for determining a process for determining the TA value.

* * * * *